(12) United States Patent
Masuda et al.

(10) Patent No.: US 8,224,143 B2
(45) Date of Patent: Jul. 17, 2012

(54) SUBSTRATE STRUCTURE AND MANUFACTURING METHOD

(75) Inventors: Shin Masuda, Tokyo (JP); Kazunori Shiota, Tokyo (JP); Atsushi Seki, Tokyo (JP)

(73) Assignee: Advantest Corporation, Tokyo (JP)

( * ) Notice: Subject to any disclaimer, the term of this patent is extended or adjusted under 35 U.S.C. 154(b) by 274 days.

(21) Appl. No.: 12/713,184

(22) Filed: Feb. 26, 2010

(65) Prior Publication Data
US 2011/0195274 A1  Aug. 11, 2011

Related U.S. Application Data

(60) Provisional application No. 61/301,637, filed on Feb. 5, 2010.

(51) Int. Cl.
*G02B 6/10* (2006.01)
*B32B 9/04* (2006.01)
*B05D 5/06* (2006.01)
*H01L 21/00* (2006.01)

(52) U.S. Cl. ........ 385/130; 385/1; 385/11; 385/14; 385/129; 385/131; 385/141; 428/693.1; 427/130; 438/29; 438/31

(58) Field of Classification Search ......... 385/1, 2, 385/3, 14, 122, 129, 130, 131, 132, 141, 385/15, 16, 11; 438/29, 31; 428/693.1; 427/130
See application file for complete search history.

(56) References Cited

U.S. PATENT DOCUMENTS

| | | | |
|---|---|---|---|
| 6,096,434 A * | 8/2000 | Yano et al. | 428/446 |
| 6,258,459 B1 * | 7/2001 | Noguchi et al. | 428/446 |
| 6,307,996 B1 * | 10/2001 | Nashimoto et al. | 385/130 |
| 6,470,125 B1 * | 10/2002 | Nashimoto et al. | 385/122 |
| 7,020,374 B2 * | 3/2006 | Talin et al. | 385/131 |
| 7,042,141 B2 * | 5/2006 | Funakubo et al. | 310/357 |
| 2004/0155559 A1 * | 8/2004 | Ifuku et al. | 310/328 |
| 2004/0207288 A1 * | 10/2004 | Funakubo et al. | 310/311 |
| 2011/0195274 A1 * | 8/2011 | Masuda et al. | 428/693.1 |

FOREIGN PATENT DOCUMENTS

| | | |
|---|---|---|
| JP | 2001-117059 | 4/2001 |
| JP | 2006-058837 | 3/2006 |

* cited by examiner

*Primary Examiner* — Brian Healy
(74) *Attorney, Agent, or Firm* — Jianq Chyun IP Office

(57) ABSTRACT

Provided is a substrate structure and a manufacturing method thereof, the substrate structure including a base substrate of single crystal; and a rhombohedral ferroelectric thin film exhibiting a spontaneous ferroelectric polarization and of a perovskite structure, the ferroelectric thin film being formed on a surface of the base substrate. The substrate structure may further include an optical waveguide formed on the ferroelectric thin film; and an electric field applying section that applies, to the optical waveguide, an electric field parallel to a surface of the base substrate. The electric field applying section generates the electric field so that the electric field direction of the electric field applied to the optical waveguide is parallel to a direction of the spontaneous ferroelectric polarization of the ferroelectric thin film.

20 Claims, 10 Drawing Sheets

SUBSTRATE STRUCTURE AND MANUFACTURING METHOD

This application claims the priority benefit of U.S. provisional application Ser. No. 61/301,637, filed Feb. 5, 2010. The entirety of the above-mentioned patent application is hereby incorporated by reference herein and made a part of specification.

BACKGROUND

1. Technical Field

The present invention relates to a substrate structure and a manufacturing method.

2. Related Art

As an optical switch and an optical modulator made of a ferroelectric material, Mach-Zehnder modulators mainly made of $LiNbO_3$ single crystal and having a modulation frequency exceeding 40 GHz are already available in the market. For example, Patent Document No. 1 and Patent Document No. 2 report an optical switch having a vertical device structure which applies an electric field in the direction vertical to a surface of a ferroelectric thin film made of such as lead lanthanum zirconate titanate (composite oxide of PbLaZrTiO system, hereinafter abbreviated as "PLZT").

Patent Document No. 1: Japanese Patent Application Publication No. 2001-117059
Patent Document No. 2: Japanese Patent Application Publication No. 2006-58837

However, the electro-optic coefficient of a $LiNbO_3$ single crystal is relatively small (e.g. 30 pm/V), and so the operating voltage can not be reduced unless the length of the device can be made no smaller than about 30 mm. Moreover, in a modulator made of $LiNbO_3$ single crystal (hereinafter referred to as "LN modulator"), a waveguide is fabricated by depositing a Ti thin film on the $LiNbO_3$ single crystal substrate, and then subjecting it to thermodiffusion. Such a Ti diffused waveguide has a weak optical confinement effect because of a small difference in refractive indexes between the core and the clad compared to that of the case of a ridge waveguide, and so undergoes a larger loss in response to sharp bending. This has made it difficult to manufacture a small-sized LN modulator or integrate it.

In addition, the PLZT thin film has a relative dielectric constant as large as several hundreds to several thousands, and in fact the $SrTiO_3$ substrate used in Patent Document No. 1 and Patent Document No. 2 has a large relative dielectric constant such as 300. Consequently, an optical switch and an optical modulator made of a ferroelectric material, expected to be manufactured smaller, end up having a large capacitance, thereby making it difficult to realize the modulation bandwidth no less than 10 GHz common in optical communication.

SUMMARY

Therefore, it is an object of an aspect of the innovations herein to provide a substrate structure and a manufacturing method, which are capable of overcoming the above drawbacks accompanying the related art. The above and other objects can be achieved by combinations described in the independent claims. The dependent claims define further advantageous and exemplary combinations of the innovations herein.

According to an aspect related to the innovations herein, one exemplary a substrate structure and a manufacturing method thereof the substrate structure including a base substrate of single crystal; and a rhombohedral ferroelectric thin film exhibiting a spontaneous ferroelectric polarization and of a perovskite structure, the ferroelectric thin film being formed on a surface of the base substrate.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

FIG. 9e shows a pole figure obtained by the X-ray spectroscopy of FIG. 9a.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
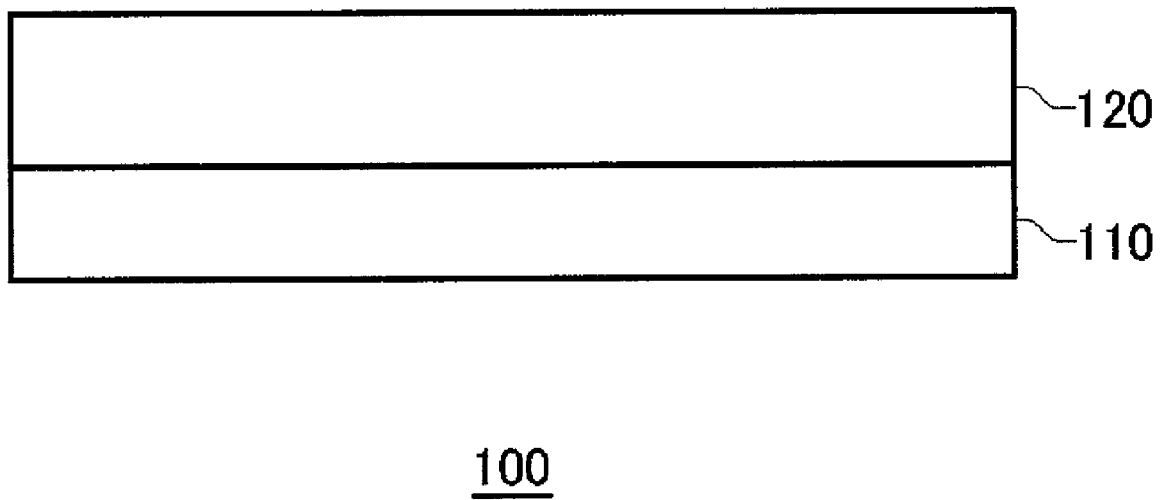
FIG. 1 shows an exemplary configuration of a substrate structure 100 according to the present embodiment.

FIG. 1 shows an exemplary configuration of a substrate structure 100 according to the present embodiment. A base substrate 110 may be made of single crystal. The base substrate 110 may also be formed by a insulation material. For example, the base substrate 110 may be an $Al_2O_3$ (sapphire) substrate or an MgO substrate. An example of the base substrate 110 is a substrate called "R-cut sapphire" made by cutting and grinding a sapphire substrate so that its (1102) plane faces front.

Because in the (1102) plane of the sapphire substrate the (110) planes are aligned in a predetermined direction, the lattice constant in a vertical orientation of the (110) planes is 5.13 Angstrom, which is the same as the lattice constant in the direction parallel to the (110) planes (hereinafter, the direction parallel to a (abc) plane is abbreviated as "(abc) direction"). The orientation in which the (110) planes are aligned corresponds to the direction normal to a (110) plane (hereinafter, the direction normal to a (abc) plane is abbreviated as "[abc] direction"), and the lattice constant in the [110] direction is 4.76 Angstrom in the (1102) plane.

Alternatively, the base substrate 110 may be a stack of several layers on a substrate. That is, because the base substrate 110 has a ferroelectric thin film 120 deposited on its surface, it may be a substrate having thereon buffer layers, for the purpose of preventing diffusion of the substrate materials into the ferroelectric thin film 120 and/or performing lattice match with the ferroelectric thin film 120.

The ferroelectric thin film 120 is formed on a surface of the base substrate 110, is rhombohedral exhibiting a spontaneous ferroelectric polarization, and has a perovskite structure. The ferroelectric thin film 120 may be epitaxially grown. The ferroelectric thin film 120 may have a thickness of no greater than 10 μm for example. The ferroelectric thin film 120 is usable as a core material for an optical waveguide for transmitting the light of wavelengths used in optical communication (e.g. a 850 nm band, a 1300 nm band, and a 1500 nm band). The film thickness of the ferroelectric thin film 120 may be designed depending on the optical wavelength to be transmitted.

The ferroelectric thin film 120 may be a PLZT thin film that contains lanthanum in the composition ratio in the range of 7 at % and 9 at %, inclusive. The ferroelectric thin film 120 may alternatively be a PZT thin film or a $BaTiO_3$ thin film. PLZT crystal, PZT crystal, and $BaTiO_3$ crystal etc. are ferroelectric crystal having a perovskite structure, a type of crystal structure which can be altered into crystal structures such as tetragon, orthorhombic crystal, rhombohedral, and cubic crystal depending on the temperature and the material composition. When the PLZT crystal, and the like. is grown as a thin film on a particular substrate, the difference in lattice constant between the substrate material and the bulk single crystal substrate tends to generate a force onto the thin film, to change the crystal structure.

For example, when a PLZT thin film, which is a ferroelectric thin film 120, is formed on a sapphire (1102) substrate, the PLZT thin film exhibits preferential ordering along the PLZT [110] direction. The crystal structure and in-plane orientation of the deposited thin film can be revealed by examining the in-plane orientation by performing X-ray diffraction (θ-2θ) and φ scanning on the ferroelectric thin film 120.

In this way, when formed as a crystal having an appropriate structure on the base substrate 110 having crystal aligned appropriately, the ferroelectric thin film 120 will have its crystal aligned parallel to the surface of the base substrate 110, so that the direction of its spontaneous ferroelectric polarization be aligned with the surface of the base substrate 110. Accordingly, the resulting substrate structure 100 can be suitable for a device applying an electric field in parallel to the direction of the spontaneous ferroelectric polarization of the PLZT thin film.

Figure 2A:
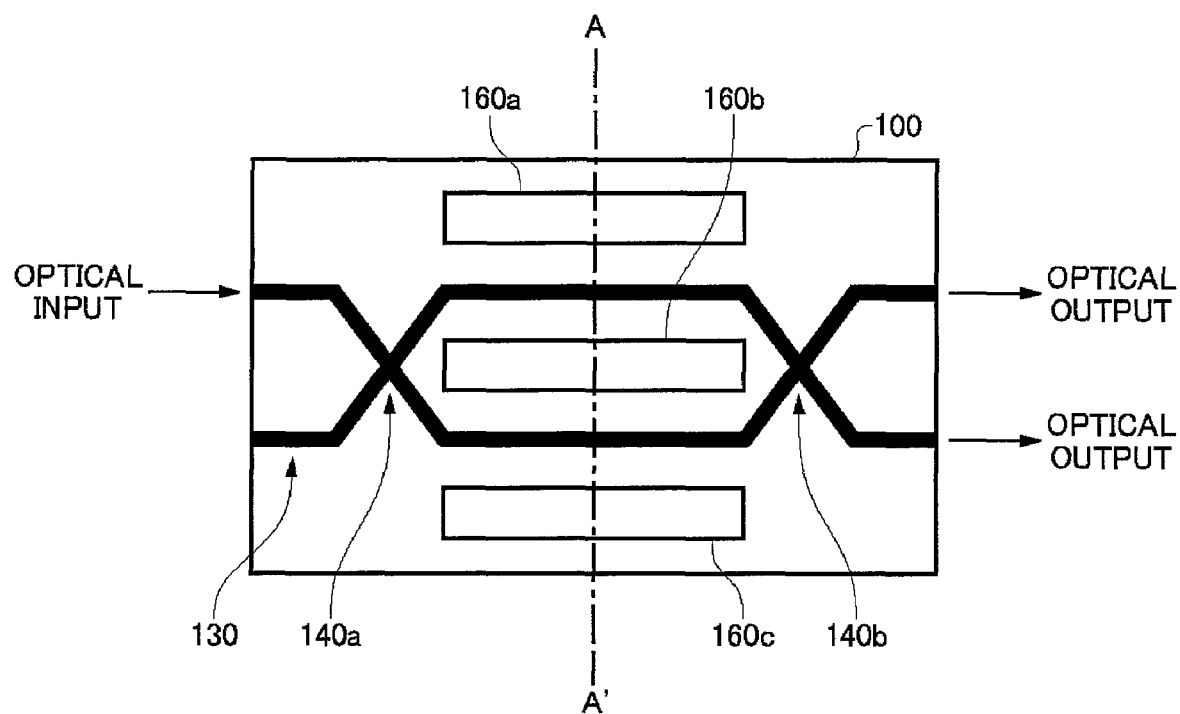
FIG. 2a shows a modification example of the substrate structure 100 according to the present embodiment.
Figure 2B:
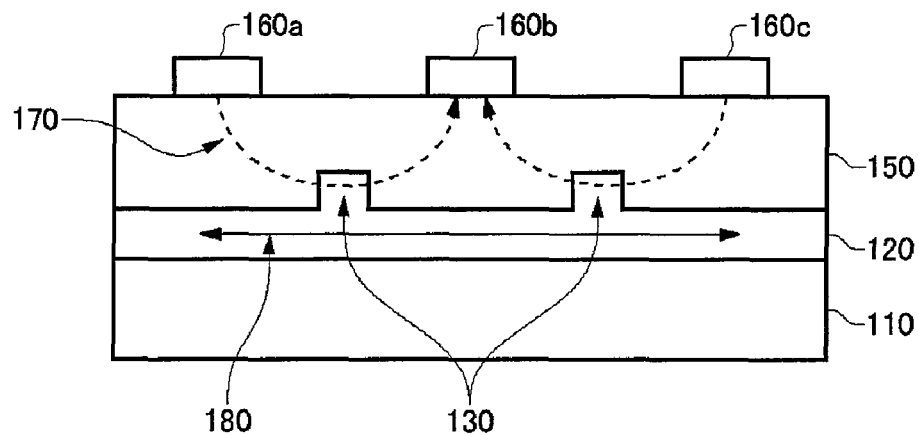
FIG. 2b shows an exemplary configuration of A-A' cross section in FIG. 2a of the substrate structure 100 according to the present embodiment.

FIG. 2a shows a modification example of the substrate structure 100 according to the present embodiment. FIG. 2b shows an exemplary configuration of A-A' cross section in FIG. 2a of the substrate structure 100 according to the present embodiment. The substrate structure 100 may be equipped with two optical outputs corresponding to two optical inputs. The present example is manufactured by processing the exemplary configuration of the substrate structure 100 according to the present embodiment explained with reference to FIG. 1.

The substrate structure 100 may function as one-input-two-output optical switch that outputs light inputted from one of the two optical inputs, from one of the two optical outputs according to the signal applied to the electrode. The substrate structure 100 may also function as a two-input-two output optical switch that outputs one of light respectively inputted to the two optical inputs, from one of the two optical outputs according to the signal applied to the electrode, and outputs another of the inputted light, from the other optical output.

The substrate structure 100 may also function as an optical modulator that, according to the modulation signal applied to the electrode, modulates the optical intensity of light inputted from one of the two optical inputs, and outputs the optical-intensity modulated light from one of the two optical outputs. The substrate structure 100 includes a base substrate 110, a ferroelectric thin film 120, an optical waveguide 130, an optical coupler 140, a low dielectric thin film 150, and an electric field applying section 160.

The optical waveguide 130 is formed on the ferroelectric thin film 120. The optical waveguide 130 may be a ridge waveguide formed by etching the ferroelectric thin film 120 into a convex shape. For example, for obtaining a single mode transfer in the wavelength band of 1500 nm, the optical waveguide 130 may be formed by subjecting the ferroelectric thin film 120 having a film thickness of 1 μm to dry etching, to create a ridge structure having a width of 1.2-1.5 μm and a depth of 0.15-0.5 μm.

Alternatively, the optical waveguide 130 may be a mesa waveguide created by etching the ferroelectric thin film 120 excluding the portion corresponding to the waveguide. Still alternatively, the optical waveguide 130 may be a slab waveguide utilizing the layers of the ferroelectric thin film 120. Alternatively, the optical waveguide 130 may be an embedded waveguide formed by etching the base substrate 110 into the shape of the waveguide, and then forming the ferroelectric thin film 120 thereon.

The optical waveguide 130 may also be a Mach-Zehnder optical waveguide including two linear waveguides provided parallel to each other. The optical coupler 140 may be an optical coupler of a two-input-two-output multimode interference method, formed by two optical waveguides 130. The optical coupler 140 may divide the two inputted light into the two optical outputs in the ratio of 1:1. Two optical waveguides 130 and two optical couplers 140 may be incorporated in the substrate structure 100, to form an optical switch or an optical modulator of Mach-Zehnder type.

The low dielectric thin film 150 is formed on the surface of the ferroelectric thin film 120, and may have a relative dielectric constant lower than that of the ferroelectric thin film 120. The low dielectric thin film 150 may be a low dielectric constant film such as $SiO_2$. Here, the base substrate 110 may also have a relative dielectric constant lower than that of the ferroelectric thin film 120. It is desirable that the base substrate 110 and the low dielectric thin film 150 respectively have a relative dielectric constant no greater than 10, and the ferroelectric thin film have a relative dielectric constant of about several hundred or several thousand.

As a result, the ferroelectric thin film 120 having a high relative dielectric constant is sandwiched between the base substrate 110 and the low dielectric thin film 150 respectively having a low relative dielectric constant and a low refractive index, thereby enabling to form an optical waveguide 130 that can effectively confine light. In addition, when using the substrate structure 100 as a modulator by supplying a modulation signal thereto, the base substrate 110 and the low dielectric thin film 150 may realize speed matching between the transfer speed of the modulation signal and the transfer speed of the light wave transferred through the optical waveguide 130. In addition, the base substrate 110 and the low dielectric thin film 150 can pre-set, to a value such as 50Ω, the characteristic impedance of the transfer line of the modulation signal.

The electric field applying section 160 applies, to the optical waveguide 130, an electric field parallel to the surface of the base substrate 110. The electric field applying section 160 may include electric field applying portions 160a and 160b, to apply, to a single linear waveguide, an electric field parallel to the surface of the base substrate 110. Alternatively, the electric field applying section 160 may include electric field applying portions 160a, 160b, and 160c, to apply, to two linear waveguides, an electric field parallel to the surface of the base substrate 110.

Here, in the substrate structure 100, the electric field applying portions 160a and 160b may be respectively formed at a uniform interval from one optical waveguide 130, to align the electric field direction 170 to be parallel to the surface of the base substrate 110. In the similar manner, in the substrate structure 100, the electric field applying portions 160b and 160c may be respectively formed at a uniform interval from the other optical waveguide 130, to align the electric field direction 170 to be parallel to the surface of the base substrate 110.

The electric field applying section 160 applies the electric field to one or both of two divisions of the optical waveguide 130 having been divided by the optical coupler 140a. The optical waveguide supplied with the electric field changes the refractive index according to the applied electric field, to change a phase of the inputted light passing through the optical waveguide. The rays of inputted light having passed through the two optical waveguides are synthesized together again by the optical coupler 140b, and then divided into two optical outputs again.

Here, the optical intensity of the synthesized light is determined by the phase change amount difference between the two inputted light generated in the two optical waveguides 130, and so the electric field applying section 160 can adjust the phase change amount difference by applying an adequate electric field to each of the optical waveguides 130, to control the intensity of optical output. In this way, the substrate structure 100 can have both functions of an optical switch and an optical modulator, by applying an adequate electric field to the electric applying section 160. Here, the electric field applying section 160 may effectively change the phase change amount difference, by applying the electric field so as to cause, to be reversed from each other, the directions of change of the refractive indices for the two optical waveguides 130.

The electric field applying section 160 may generate an electric field so that the electric field direction 170 of the electric field applied to the optical waveguide 130 be parallel to the direction 180 of the spontaneous ferroelectric polarization in the ferroelectric thin film 120. The ferroelectric thin film 120 in crystal state shows the spontaneous ferroelectric polarization direction 180 parallel to the surface of the base substrate 110. Therefore, the substrate structure 100 is able to set the electric field direction 170 of the electric field applied to the optical waveguide 130 by the electric field applying section 160 to be parallel to the spontaneous ferroelectric polarization direction 180. As a result, the substrate structure 100 can obtain a large electro-optic effect, and efficiently operate the optical switch and the optical modulator.

Here, the PLZT thin films, being the ferroelectric thin film 120, differ in direction of spontaneous ferroelectric polarization according to their crystal structure. For example, the direction of the spontaneous ferroelectric polarization of the PLZT thin film of a tetragon is parallel to the PLZT [001] direction. In view of this, in the substrate structure 100, the longitudinal direction of the electric field applying section 160 may be aligned to be vertical to the PLZT [001] direction, for most efficient application of electric field.

The direction of the spontaneous ferroelectric polarization of the rhombohedral PLZT thin film of is ±55 degrees from the PLZT [001] direction (i.e. the PLZT [111] direction). In view of this, in the substrate structure 100, the longitudinal direction of the electric field applying section 160 may be set at ±55 degrees from the PLZT [001] direction. By forming the electric field applying section 160 of the substrate structure 100 so that the straight line connecting the electric field applying portions 160a and 160b to be parallel to the spontaneous ferroelectric polarization direction 180 according to the spontaneous ferroelectric polarization direction 180 of the ferroelectric thin film 120, the optical waveguide 130 can be most efficiently provided with an electric field.

Note that for the ferroelectrics, the spontaneous ferroelectric polarization value is in proportional relationship with the electro-optic coefficient. In addition, the direction of the spontaneous ferroelectric polarization of the ferroelectrics is in the [100] direction when the crystal structure is either tetragon and pseudocubic crystal, and in the [111] direction when the crystal structure is rhombohedral. It is also known that the spontaneous ferroelectric polarization value of rhombohedral is $3^{1/2}$ times greater than that of a tetragon. Therefore, the ferroelectrics of rhombohedral can have an electro-optic coefficient larger than that of tetragon and pseudocubic crystal, which is effectively used in small-sized devices.

The electric field applying section 160 may have a coplanar transfer path for applying an electric field to two linear waveguides. The electric field applying section 160 may adjust the phase change amount difference by applying different electric fields to the linear waveguides from each other. Here, the electric field applying section 160 may apply electric fields in reverse directions to each other, to two linear waveguides having the same length. For example, the substrate structure 100 applies an electric field signal to the electric field applying portion 160b, using the electric field applying portions 160a and 160c as a common electrode. By doing so, the substrate structure 100 may easily supply the phase change amount in reverse phases to each other, by using the electric field applying portions 160a and 160c as a common electrode.

The electric field applying section 160 may have a coplanar transfer path as an electrode structure. In particular, when providing a function of a high-speed optical modulator, the substrate structure 100 may form a coplanar transfer path as a electrode structure. Accordingly, the substrate structure 100 can form a electric field applying section 160 having such a transfer characteristic as low loss and low reflection in response to high frequency modulation signals provided from outside.

In addition, the substrate structure 100 can realize speed matching between the transfer speed of the modulation signal and the transfer speed of the light wave transmitted through the optical waveguide 130. In addition, in the substrate structure 100, the characteristic impedance of the transfer line of the modulation signal may be easily pre-set to a predetermined value such as 50Ω.

Figure 3A:
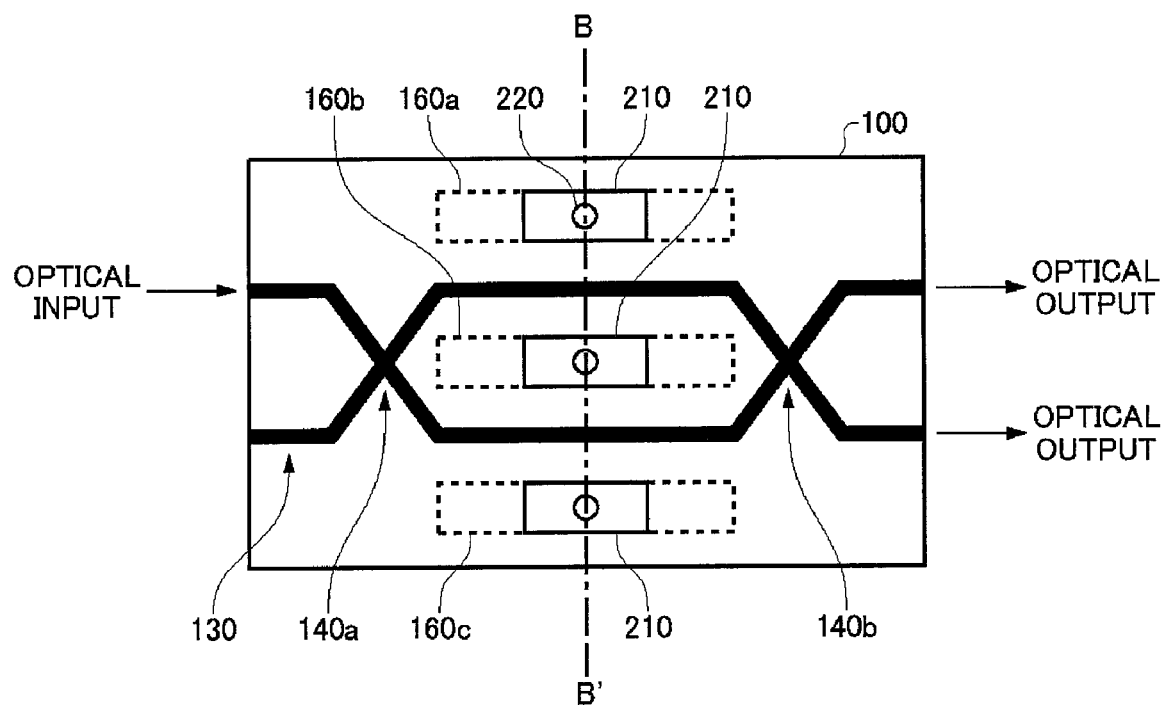
FIG. 3a shows a configuration of a modification example of the substrate structure 100 according to the present embodiment.
Figure 3B:
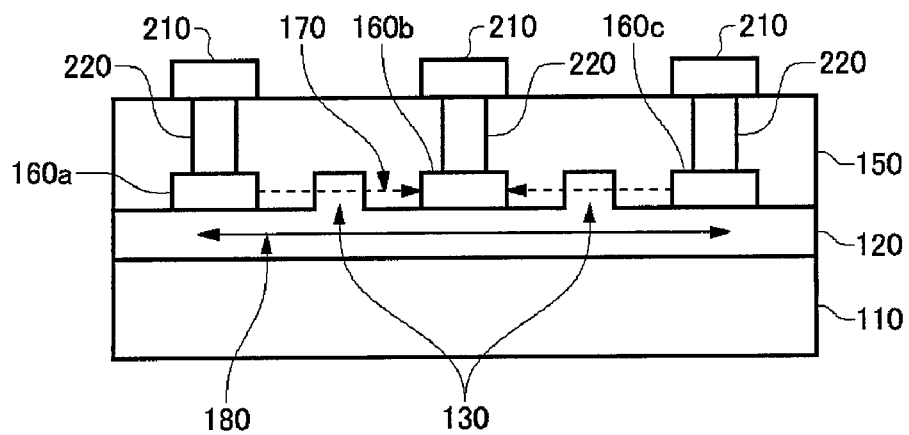
FIG. 3b shows an exemplary configuration of B-B' cross section in FIG. 3a of the modification example of the substrate structure 100 according to the present embodiment.

FIG. 3a shows a configuration of a modification example of the substrate structure 100 according to the present embodiment. FIG. 3b shows an exemplary configuration of B-B' cross section in FIG. 3a of the modification example of the substrate structure 100 according to the present embodiment. The members in the substrate structure 100 of FIGS. 3a and 3b of the present embodiment and those of FIGS. 2a and 2b that perform the same operations are assigned the same reference numerals.

In the substrate structure 100 according to the present modification example, directly formed on the ferroelectric thin film 120 is an electric field applying section 160 for applying an electric field to the optical waveguide 130. The electric field applying section 160 is electrically connected via the electrode 210 on the low dielectric thin film 150 and a penetrating via 220. The electric field applying section 160, which aims to effectively supply an electric field to the optical waveguide 130, may be larger than the electrode 210 which aims to provide electrical connection.

If such a configuration is adopted, the substrate structure 100 according to the present modification example can contain the electric field applying section 160 in the low dielectric thin film 150, and provide the electrode 210 smaller in area than the electric field applying section 160 on the surface of the low dielectric thin film 150. As a result, the substrate structure 100 can prevent interference between electrodes. As a result, the substrate structure 100 can improve degree of freedom in electrode shape and electrode alignment of the electrode 210.

Figure 4:
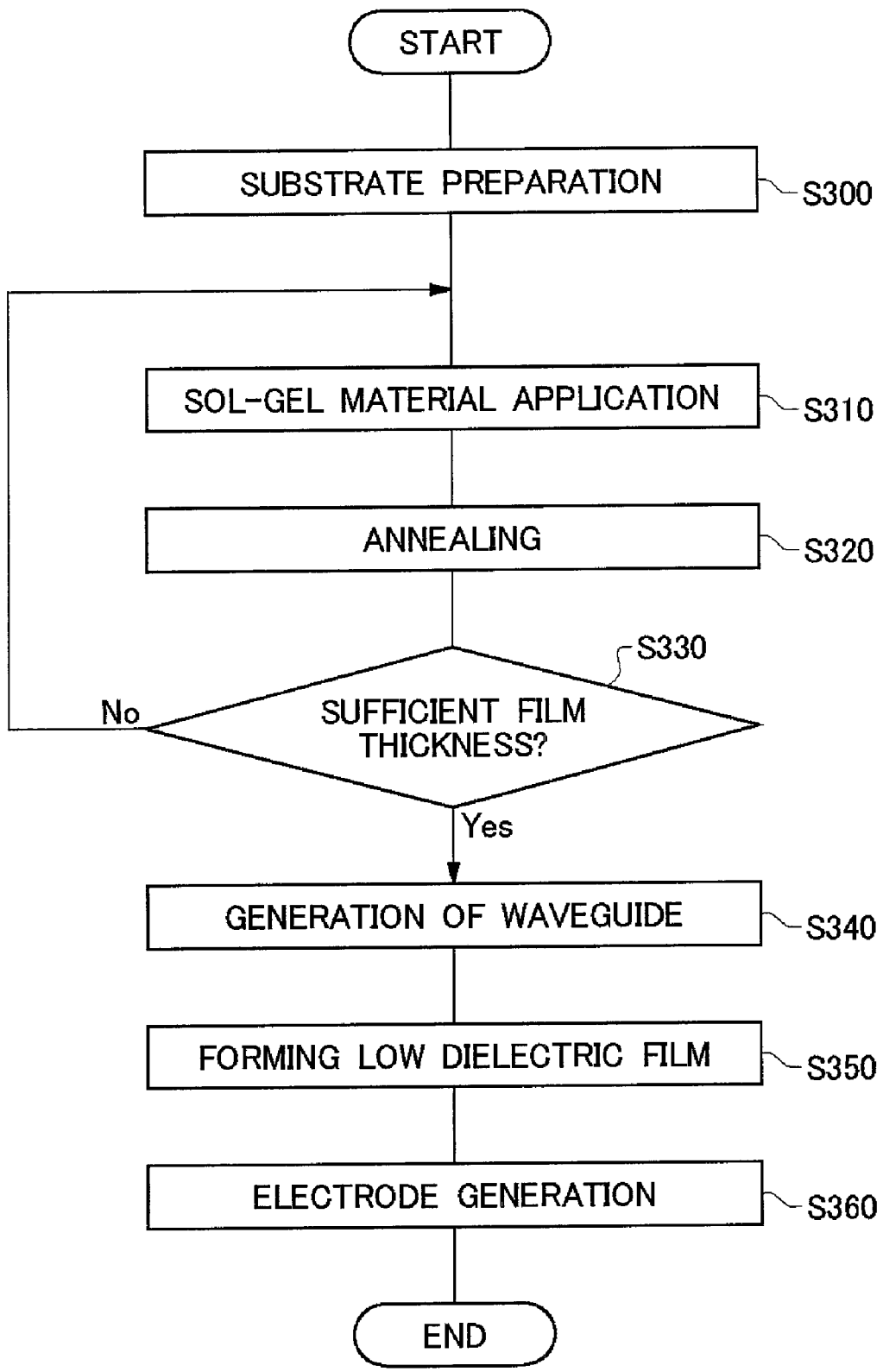
FIG. 4 shows a manufacturing flow of a substrate structure 100 according to the present embodiment.

FIG. 4 shows a manufacturing flow of a substrate structure 100 according to the present embodiment. First, a single-crystal base substrate 110 is prepared in a substrate preparing step (S300). Here, the base substrate 110 may include the above-mentioned buffer layer. An example of the buffer layer is a $PbTiO_3$ thin film formed by applying a $PbTiO_3$ sol-gel material on the base substrate 110, and drying and thermode-compressing the result by annealing processing.

Next, the sol-gel material is applied on the base substrate 110 (S310). On the base substrate 110, a sol-gel material suitable for a ferroelectric thin film 120 to be formed is applied. Some example of the sol-gel material is a sol-gel fluid having a composition called "PLZT8/65/35" or "PZT52/48." Here, "8/65/35" denote a ratio of La, Zr, and Ti atoms in the stated order. To be more accurate, they represent a ratio determined stoichiometrically, and PLZT is denoted as $Pb_{1-X}La_X(Zr_YTi_{1-Y})_{1-X/4}O_3$, and the representation of "8/65/35" is used when X is 0.08 and Y is 0.65. Likewise, PZT is denoted as $Pb(Zr_YTi_{Y-1})O_3$, and the representation of "52/48" is used when Y is 0.52.

Next, the applied sol-gel material is annealed under the predetermined atmospheric temperature, to form a rhombohedral ferroelectric thin film 120 exhibiting a spontaneous ferroelectric polarization, and having a perovskite structure and (S320). The base substrate 110 may be crystallized by annealing using an annealing apparatus such as a hot plate, a baking oven, a furnace, and a lamp annealer.

The ferroelectric thin film 120 may be a PLZT thin film that contains lanthanum in the composition ratio in the range of 7 at % and 9 at %, inclusive. The ferroelectric thin film 120 may alternatively be a PZT thin film or a $BaTiO_3$ thin film. The base substrate 110 may be annealed by setting the rate at which the atmospheric temperature is raised and lowered to be smaller than 7 degrees per second. The base substrate 110 is annealed by setting the rate at which the atmospheric temperature is raised and lowered to be smaller than 3 degrees per second. In addition, the ferroelectric thin film 120 may be annealed under the maximum atmospheric temperature in the range of 550 degrees and 650 degrees, inclusive.

In addition, the ferroelectric thin film 120 is annealed in the atmosphere containing oxygen in the volume ratio of no smaller than 20%, and pressurized to no smaller than the atmospheric pressure. Alternatively, the ferroelectric thin film 120 may be annealed in the atmosphere containing oxygen in the volume ratio of about 21%, which is the same level as that of the atmospheric air. Here, the ferroelectric thin film 120 may be annealed in the atmosphere pre-pressurized to a predetermined pressure between 0.1 MPa and 0.3 MPa, for a predetermined period of time.

For example, the ferroelectric thin film 120 is annealed in the atmosphere pre-pressurized to a predetermined pressure between 0.1 MPa and 0.2 MPa. Here, a heating period of the ferroelectric thin film 120 and a period required for the ferroelectric thin film 120 to return to normal temperature after heating are set to a predetermined period.

Then, Step S310 through Step S330 are repeated until a ferroelectric thin film 120 having a predetermined film thickness is formed on the base substrate 110. After the ferroelectric thin film 120 having a predetermined film thickness is stacked on the base substrate 110, the stacked ferroelectric thin film 120 is processed to form an optical waveguide 130 (S340). The optical waveguide 130 may be a ridge waveguide.

Here, a Mach-Zehnder optical waveguide containing two linear waveguides may be formed in a predetermined direction in the ferroelectric thin film 120. For example, the two linear waveguides are formed in a direction vertical to the spontaneous ferroelectric polarization direction 180 of the ferroelectric thin film 120. For example, for a substrate structure 100 formed by depositing rhombohedral PLZT thin film on a sapphire substrate, the spontaneous ferroelectric polarization direction 180 may be at ±55 degrees from the PLZT [001] direction. Therefore, the two linear waveguides may be formed at ±55 degrees from the PLZT [001] direction, i.e. from the sapphire [110] direction.

A low dielectric thin film 150, having a lower dielectric constant than that of the ferroelectric thin film 120, is further formed on the substrate structure 100 (S350). Once the low dielectric thin film 150 having a predetermined film thickness is formed on the substrate structure 100, an electric field applying section 160 is formed as an electrode on the low dielectric thin film 150 (S360). The electric field applying section 160 may be a metal electrode and/or an oxide electrode having a predetermined shape and formed by vacuum evaporation or sputtering. A coplanar transfer lines may be formed as the electric field applying section 160.

Here, the electric field applying section 160 may be formed so that its longitudinal direction is parallel to the direction in which the two linear waveguides of the Mach-Zehnder optical waveguide are formed. By doing so, the substrate structure 100 is able to set the electric field direction 170 of the electric field applied to the optical waveguide 130 by the electric field applying section 160 to be parallel to the spontaneous ferroelectric polarization direction 180 of the ferroelectric thin film 120. The manufacturing flow of the substrate structure 100 according to the above-described present embodiment manufactures a substrate structure 100 that can efficiently operate the optical switch and the optical modulator.

Figure 5:
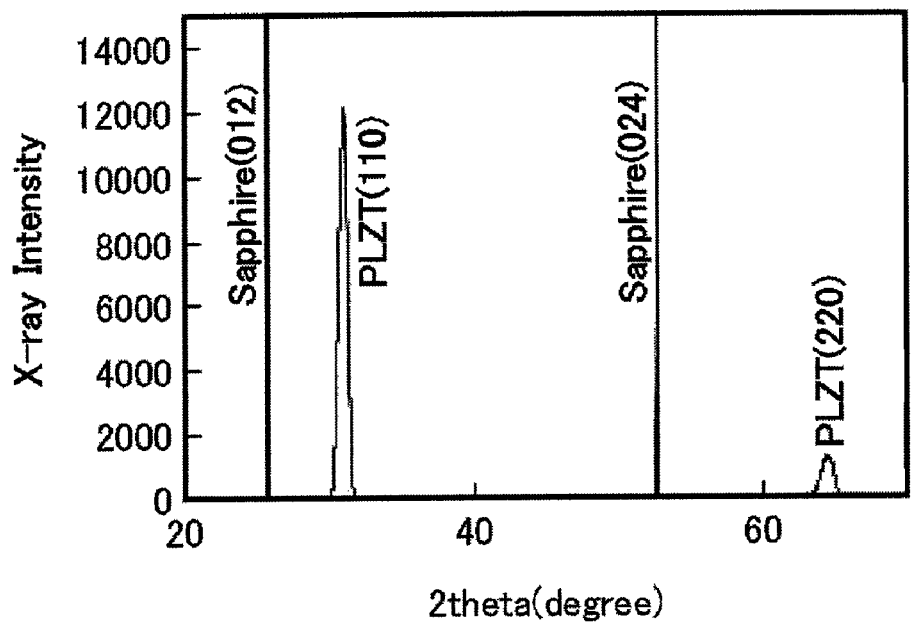
FIG. 5 shows an X-ray spectroscopy (2θ/θ scanning) result of the substrate structure 100 manufactured according to a manufacturing method according to the present embodiment.

FIG. 5 shows an X-ray spectroscopy (2θ/θ scanning) result of the substrate structure 100 manufactured according to a manufacturing method according to the present embodiment. The lateral axis in the drawing corresponds to an angle between the incident direction and the reflection direction, and the longitudinal axis corresponds to the diffraction intensity. According to this method, a noticeable peak is observed if there is a parallel orientation with respect to the sample surface. The manufactured substrate structure 100 is a PLZT8/65/35 thin film deposited on the sapphire (1102) substrate. Since the result shows a noticeable peak, it is interpreted that the substrate structure 100 is parallel to the sample surface, and the PLZT film on the substrate structure 100 exhibits preferential ordering along PLZT (110) direction.

Figure 6:
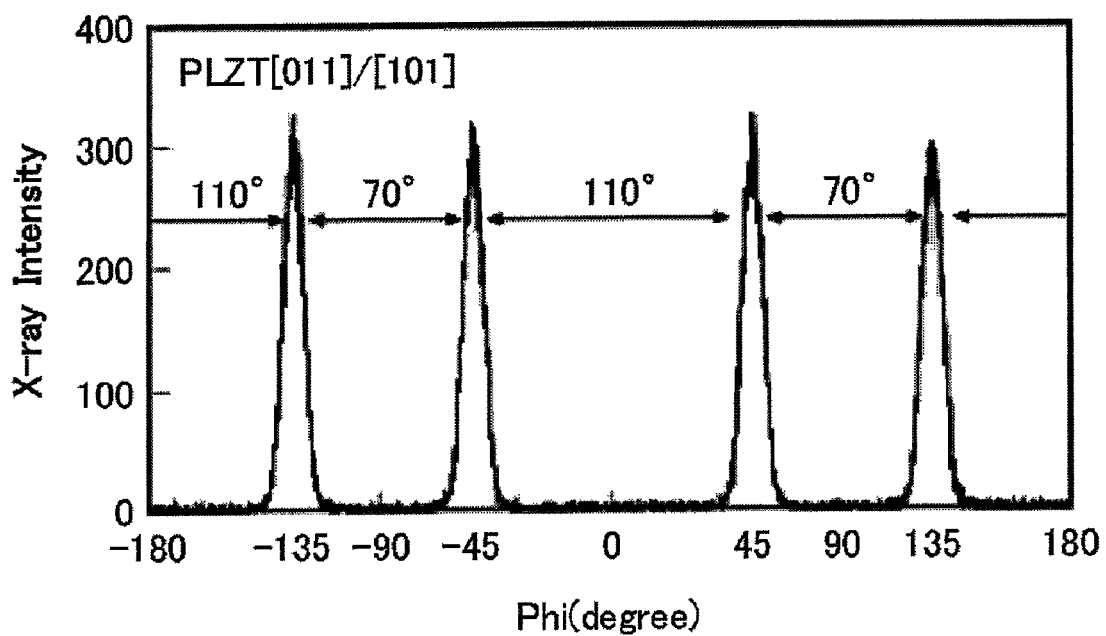
FIG. 6 shows an X ray spectroscopic (φ scanning) result of the substrate structure 100 manufactured according to a manufacturing method according to the present embodiment.

FIG. 6 shows an X ray spectroscopic (φ scanning) result of the substrate structure 100 manufactured according to a manufacturing method according to the present embodiment. The lateral axis in the drawing corresponds to an angle of the incident direction, and the longitudinal axis corresponds to the diffraction intensity. Because of detecting only a diffraction line from an interval between particular lattice planes in a crystal, this method can evaluate the inclination from a particular lattice plane for the orientation of oriented crystal.

From the analysis result, two peaks are observed at a position of ±55 degrees with the PLZT [001] direction corresponding to 0 degree in the lateral axis as a center, in the manufactured substrate structure 100. In addition, two peaks are observed at a position of +55 degrees with the position of 180 degrees reverse to the PLZT [001] corresponding to 180 degrees in the lateral axis as a center. That is, the PLZT8/65/35 thin film deposited on the sapphire (1102) substrate shows a spontaneous ferroelectric polarization inclined±55 degrees from the PLZT[001] direction, and so is a rhombohedral PLZT thin film.

Figure 7:
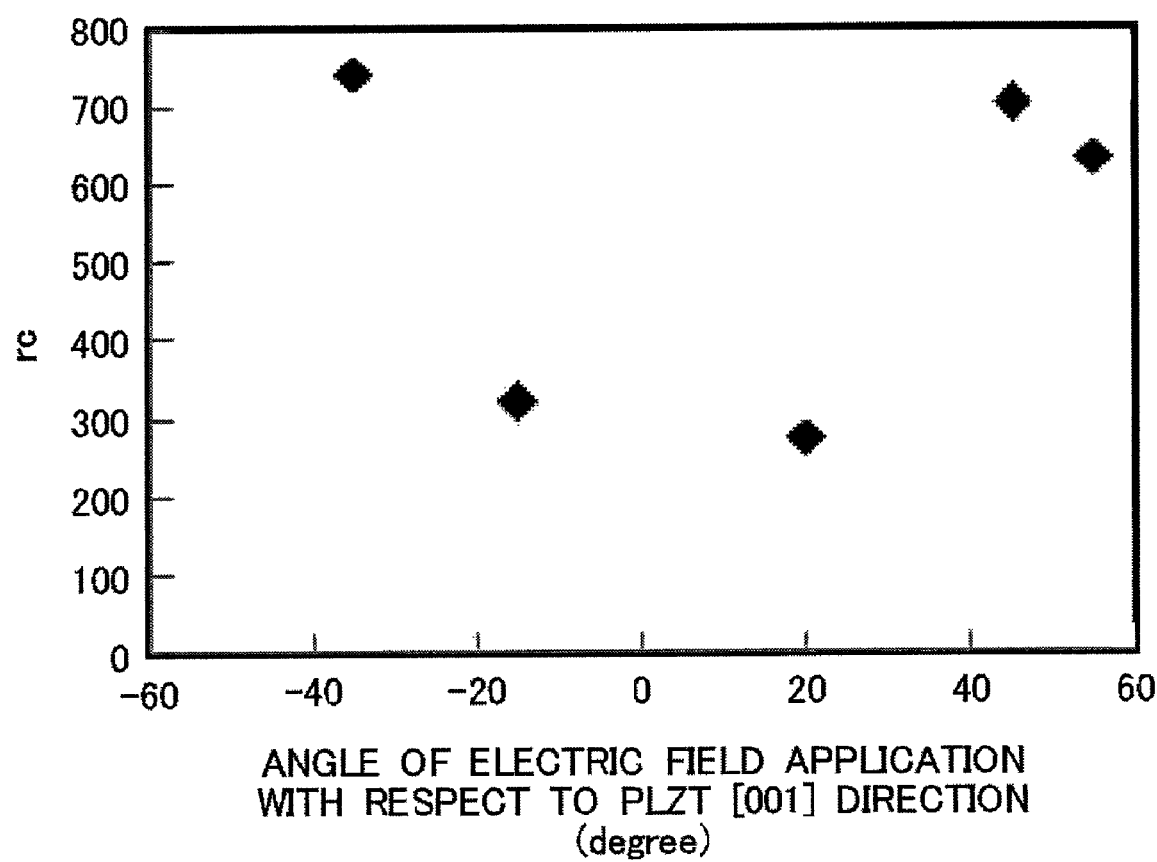
FIG. 7 shows an angular dependency of an electric field application, on the electro-optic coefficient in the substrate structure 100 manufactured according to the manufacturing method according to the present embodiment.

FIG. 7 shows an angular dependency of an electric field application on the electro-optic coefficient in the substrate structure 100 manufactured according to the manufacturing method according to the present embodiment. The lateral axis in the drawing corresponds to an angle of electric field application with respect to the PLZT [001] direction, and the longitudinal axis is an electro-optic coefficient in the unit of pm/V. The present drawing shows a result of measuring electro-optic coefficients respectively of a plurality of substrate structures 100 manufactured by varying the angles of the optical waveguide 130 and the electric field applying section 160 with respect to the PLZT [001] direction.

The result shows the electro-optic coefficient of the substrate structure 100 has angular dependency on electric field application. Moreover, since the crystal structure of the manufactured substrate structure 100 is rhombohedral, it is confirmed that a larger electro-optic coefficient can be obtained by application, using the electric field applying section 160, of an electric field in the direction of ±55 degrees from the PLZT [001] direction.

Figure 8:
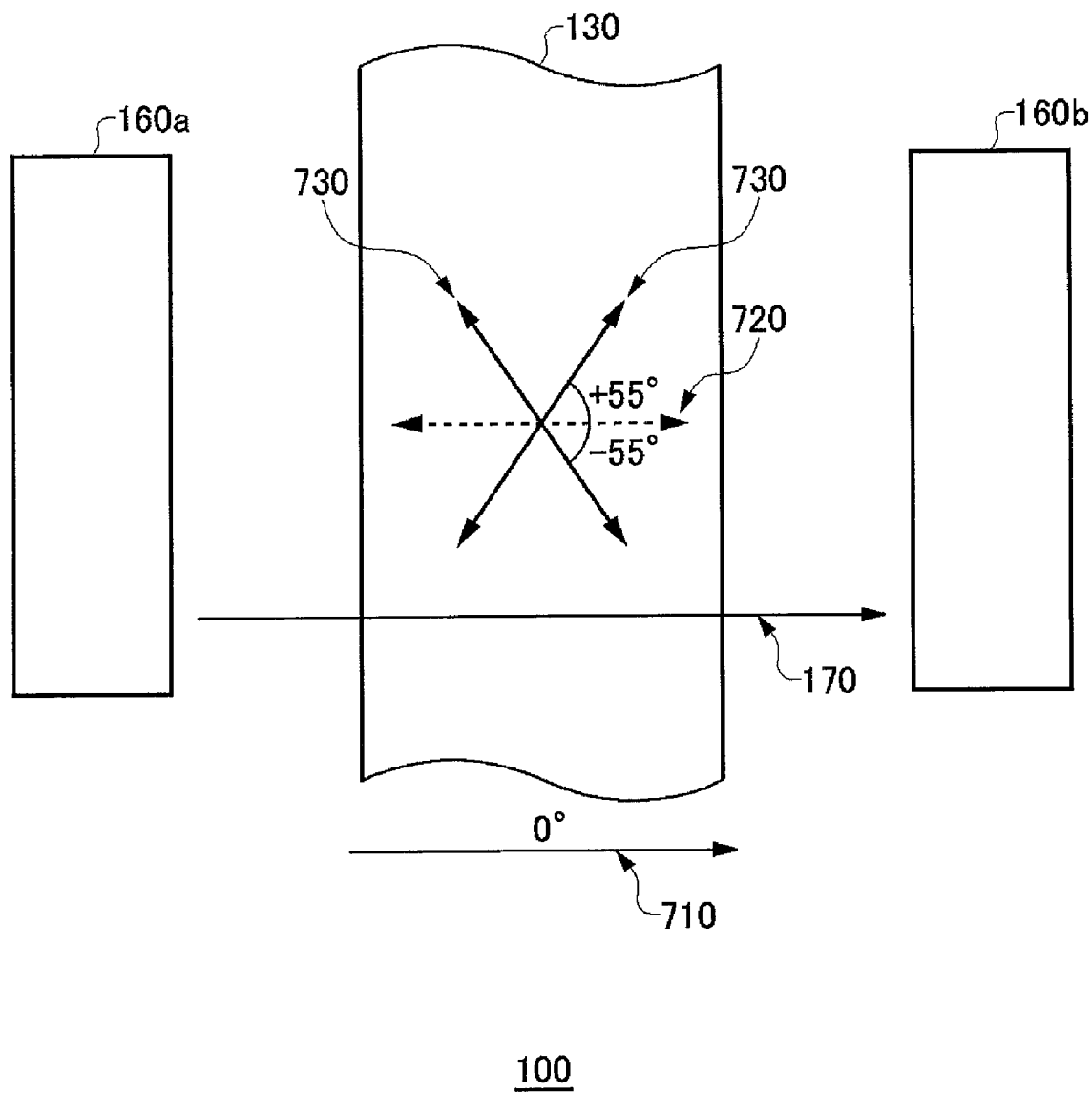
FIG. 8 shows an exemplary relation between the direction of the spontaneous ferroelectric polarization and the PLZT [001] direction of the substrate structure 100 according to the present embodiment.

FIG. 8 shows an exemplary relation between the direction of the spontaneous ferroelectric polarization and the PLZT [001] direction of the substrate structure 100 according to the present embodiment. On the substrate structure 100, a PLZT8/65/35 thin film is formed on a sapphire (1102) substrate, and an optical waveguide 130 and an electric field applying section 160 are also formed thereon. The electric field direction 170 corresponds to the direction from the electric field applying portion 160*a* to the electric field applying portion 160*b*, or from the electric field applying portion 160*b* to the electric field applying portion 160*a*, and the direction from the electric field applying portion 160*a* to the electric field applying portion 160*b* is assumed to be 0 degree in this drawing and in FIG. 7.

In the present example, the optical waveguide 130 and the electric field applying section 160 are formed so that the PLZT [001] direction 710 matches the electric field direction 170. When the PLZT8/65/35 thin film is formed in a crystal structure of tetragon, the spontaneous ferroelectric polarization is in the spontaneous ferroelectric polarization direction 720 of tetragon, and so matches the PLZT [001] direction 710. In other words, the electric field direction 170 matches the spontaneous ferroelectric polarization direction of the PLZT8/65/35 thin film, resulting in most efficient electro-optic effect for the substrate structure 100.

On the other hand, when the PLZT8/65/35 thin film is formed by a crystal structure of rhombohedral, the spontaneous ferroelectric polarization is in the spontaneous ferroelectric polarization direction 730 of rhombohedral, which is displaced ±55 degrees from the PLZT [001] direction 710. Therefore, the electric field direction 170 does not match the spontaneous ferroelectric polarization direction of the PLZT8/65/35 thin film, and so the substrate structure 100 cannot achieve an efficient electro-optic effect.

In other words, the electro-optic coefficients of PLZT8/65/35 thin films of a same crystal structure can be different depending on their electric field application directions. The substrate structure 100 can achieve most efficient electro-optic effect, by causing the spontaneous ferroelectric polarization direction 180 of the deposited ferroelectric thin film 120 to match the electric field direction 170. When a PLZT8/65/35 thin film is formed in a crystal structure of rhombohedral, the longitudinal direction of the optical waveguide 130 and the electric field applying section 160 of the substrate structure 100 should be formed to be displaced ±55 degrees from the PLZT [001] direction 710, so as to apply an electric field in the direction of ±55 degrees from the PLZT [001] direction 710.

In the above-explained embodiment, the PLZT thin film which is a ferroelectric thin film 120 can control the crystal structure, by adequately setting conditions such as the annealing temperature rising/falling rates used in a sol-gel process, or the like. The bulk PLZT crystal is known as a composition whose properties such as electro-optic coefficient and piezoelectric coefficient show their maximum values when a composition ratio of La, Zr, and Ti atoms takes a particular value called Near "Morphological Phase Boundary (MPB)." For example, some report indicates that the PLZT8/65/35 composition is a composition in the vicinity of MPB, and has an electro-optic coefficient of 500-700 pm/V.

On the other hand, a PLZT thin film deposited on a substrate is reported to have an electro-optic coefficient of about 30-100 pm/V. Experiments proved, as one cause of this electro-optic property deterioration, that a PLZT thin film formed on a substrate has a changed crystal structure during the crystallization annealing process, due to excessive loss of Pb elements, composition displacement from the stoichiometric composition attributable to lack of oxygen, and/or stress from the substrate.

Although the composition of bulk PLZT crystal exhibits a rhombohedral crystal structure near the MPB, the composition of the PLZT thin film formed on a conventional substrate, even those near the MPB, will have a crystal structure close to that of tetragon or of pseudocubic crystal in response to the stress from the substrate, to lead to deterioration in electro-optic properties. Therefore in the annealing process for forming a PLZT thin film on a substrate, the PLZT thin film has been shown to change its crystal structure depending on the annealing conditions utilized. Furthermore, it has been shown that if a crystallization annealing process for a PLZT thin film is performed while giving pressures in an oxygen atmosphere, oxygen lack as well as Pb removal can be restrained in a thin film, thereby enabling to form a ferroelectric film of a stoichiometric composition.

Figure 9A:
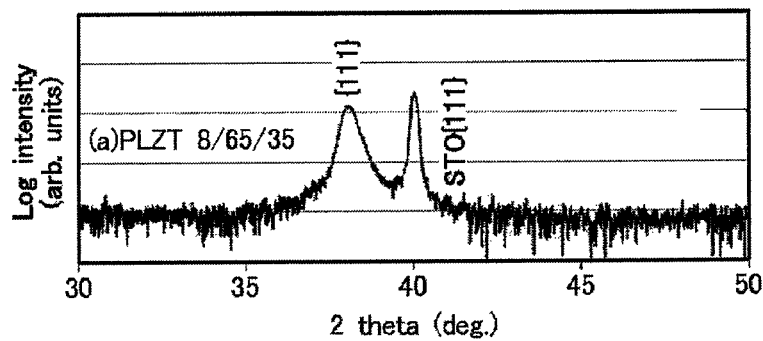
FIG. 9a shows an X-ray spectroscopy result of a PLZT8/65/35 thin film of pseudocubic crystal manufactured under annealing conditions different from those used in the manufacturing method according to the present embodiment.
Figure 9E:
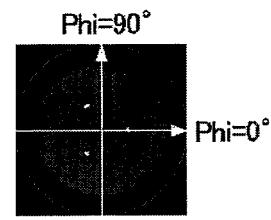
Figure 9B:
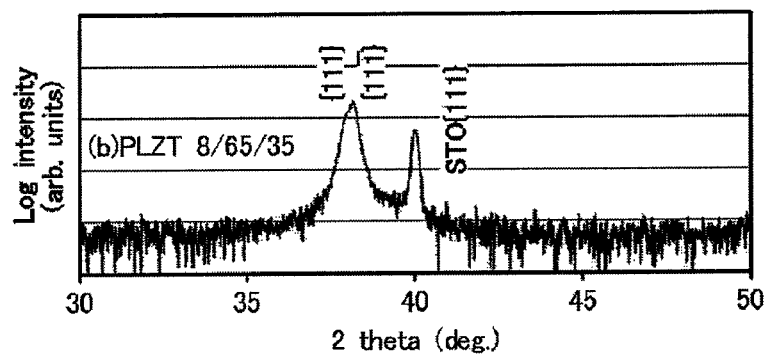
FIG. 9b shows an X-ray spectroscopy result of a rhombohedral PLZT8/65/35 thin film manufactured in the manufacturing method according to the present embodiment.
Figure 9F:
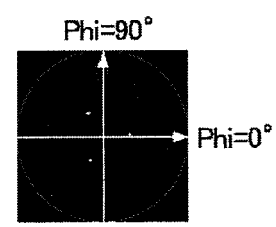
FIG. 9f shows a pole figure obtained by the X-ray spectroscopy of FIG. 9b.

FIG. 9a shows an X-ray spectroscopy result of a PLZT8/65/35 thin film manufactured under annealing conditions different from that used in the manufacturing method according to the present embodiment. FIG. 9e shows a pole figure obtained by the X-ray spectroscopy of FIG. 9a. The PLZT8/65/35 thin film in the present example is manufactured at the temperature rising/falling rates of 7 degrees centigrade/sec. FIG. 9b shows an X-ray spectroscopy result of a PLZT8/65/35 thin film manufactured in the manufacturing method according to the present embodiment. FIG. 9f shows a pole figure obtained by the X-ray spectroscopy of FIG. 9b. The PLZT8/65/35 thin film is manufactured at the temperature rising/falling rates of 3 degrees centigrade/sec. Two kinds of PLZT thin films are formed on a sapphire substrate, each having undergone a maximum atmospheric temperature of 650 degrees centigrade and annealing processing for 5 minutes.

From the pole figures in FIG. 9e and FIG. 9f, the crystallinity of the grown thin film can be evaluated by the rotation symmetry of the drawn points. The symmetric pole figure has been obtained three times in each drawing, which proves favorable orientation of the formed crystal plane for the two kinds of PLZT thin films. In other words, the two kinds of PLZT thin films are proved to be epitaxially grown which grows the PLZT film in line with the crystal plane of the sapphire substrate.

From FIG. 9a and FIG. 9b, a peak is observed in the (111) direction corresponding to pseudocubic crystal close to cubic crystal, for the PLZT8/65/35 thin film manufactured at the temperature rising/falling rates of 7 degrees centigrade/sec. As opposed to this, two separate peaks (111) unique to rhombohedral are observed, for the PLZT8/65/35 thin film manufactured at the temperature rising/falling rates of 3 degrees centigrade/sec. This proves that the crystal structure of the PLZT8/65/35 thin film is affected by the temperature rising/falling rates.

Figure 9C:
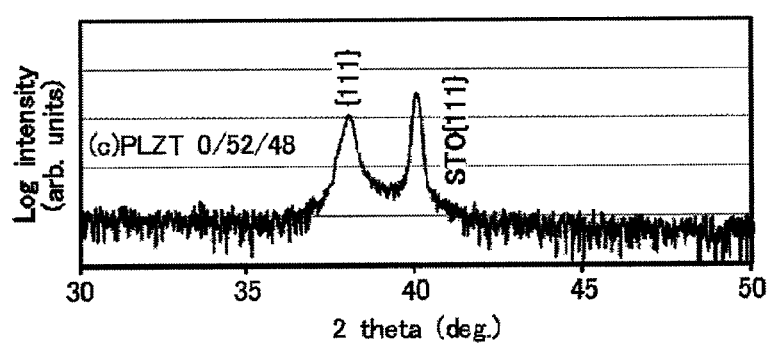
FIG. 9c shows an X-ray spectroscopy result of a PZT52/48 thin film of tetragon manufactured under annealing conditions different from that used in the manufacturing method according to the present embodiment.
Figure 9G:
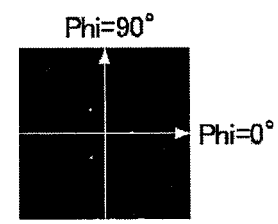
FIG. 9g shows a pole figure obtained by the X-ray spectroscopy of FIG. 9c.
Figure 9D:
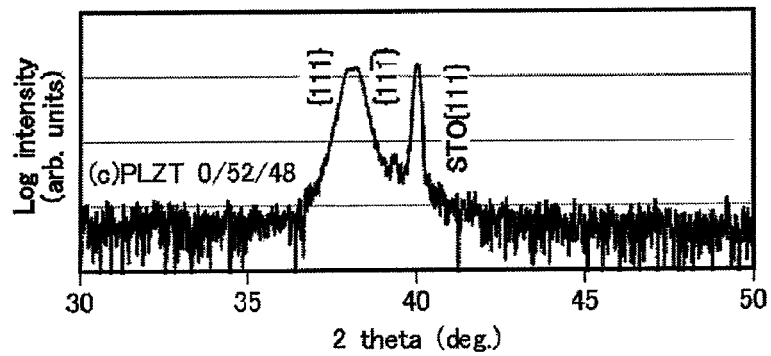
FIG. 9d shows an X-ray spectroscopy result of a rhombohedral PZT52/48 thin film manufactured in the manufacturing method according to the present embodiment.
Figure 9H:
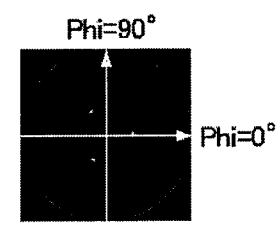
FIG. 9h shows a pole figure obtained by the X-ray spectroscopy of FIG. 9d.

FIG. 9c shows an X-ray spectroscopy result of a PZT52/48 thin film manufactured under annealing conditions different from that used in the manufacturing method according to the present embodiment. FIG. 9g shows a pole figure obtained by the X-ray spectroscopy of FIG. 9c. The PZT52/48 thin film in this example is manufactured at the temperature rising/falling rates of 7 degrees centigrade/sec. FIG. 9d shows an X-ray spectroscopy result of a PZT52/48 thin film manufactured in the manufacturing method according to the present embodiment. FIG. 9h shows a pole figure obtained by the X-ray spectroscopy of FIG. 9d. The PZT52/48 thin film in this example is manufactured at the temperature rising/falling rates of 3 degrees centigrade/sec. Two kinds of PZT thin films are formed on a sapphire substrate, each having undergone a maximum atmospheric temperature of 650 degrees centigrade and annealing processing for 5 minutes.

The symmetric pole figure has also been obtained three times in each of the pole figures of FIG. 9g and FIG. 9h, which proves favorable orientation of the formed crystal plane for the two kinds of PZT thin films. In other words, the two kinds of PZT thin films are proved to be epitaxially grown which grows the PZT film in line with the crystal plane of the sapphire substrate.

From FIG. 9c and FIG. 9d, a peak is observed in the (111) direction corresponding to pseudocubic crystal close to cubic crystal, for the PZT52/48 thin film manufactured at the temperature rising/falling rates of 7 degrees centigrade/sec. As opposed to this, two separate peaks (111) unique to rhombohedral are observed, for the PZT52/48 thin film manufactured at the temperature rising/falling rates of 3 degrees centigrade/sec. This proves that the crystal structure of the PZT52/48 thin film is affected by the temperature rising/falling rates, just as the PLZT8/65/35 thin film.

The electro-optic property is measured for the two kinds of PLZT8/65/35 thin films, and the result shows that pseudocubic crystal manufactured at the temperature rising/falling rates of 7 degrees centigrade/sec has an electro-optic property of 228 pm/V, and the rhombohedral crystal manufactured at the temperature rising/falling rates of 3 degrees centigrade/sec has an electro-optic property of 390 pm/V. Since the two kinds of PLZT8/65/35 thin films are proved to grown on the sapphire substrate with favorable crystallinity by adopting appropriate conditions such as maximum atmospheric temperature, pressure, and oxygen concentration in forming the films, they are proved to achieve an electro-optic coefficient larger than the reported value. It is also proved that a ferroelectric thin film can achieve a larger electro-optic coefficient by adequately setting the temperature rising/falling rates, than others having the same composition.

The substrate structure 100 according to the present embodiment has a configuration equipped with three electric field applying portions 160 for one Mach-Zehnder waveguide. Alternatively, the substrate structure 100 may be equipped with four or more electric field applying portions 160.

Figure 10A:
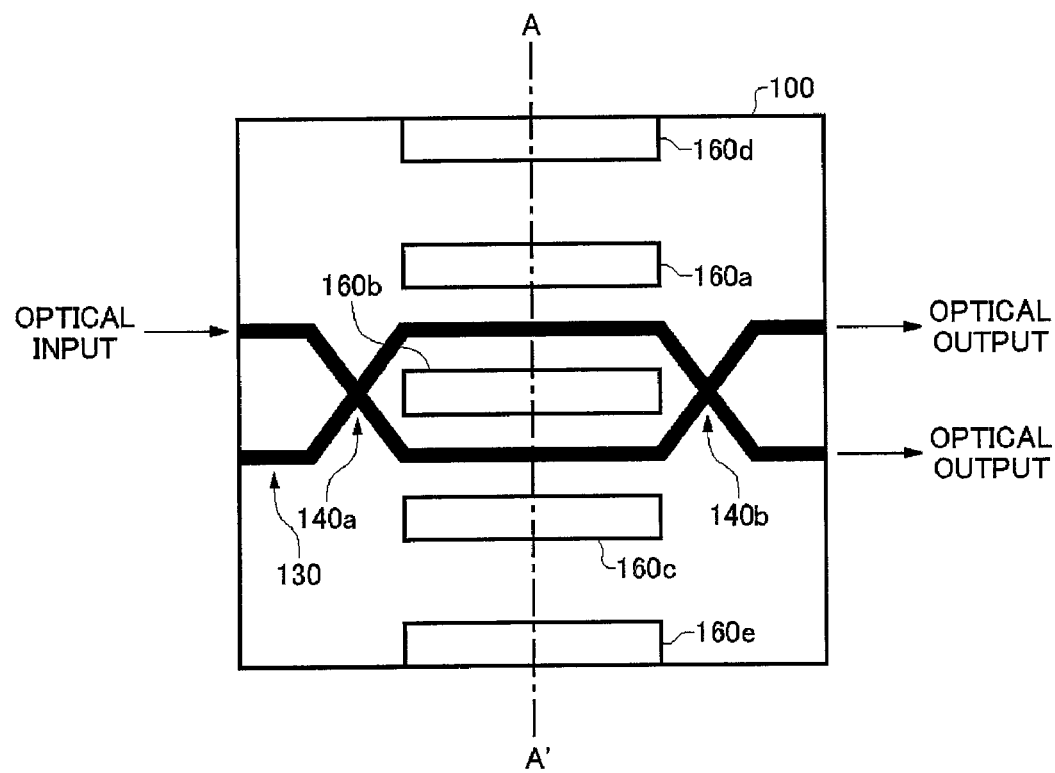
FIG. 10a shows a configuration of a modification example of the substrate structure 100 according to the present embodiment.
Figure 10B:
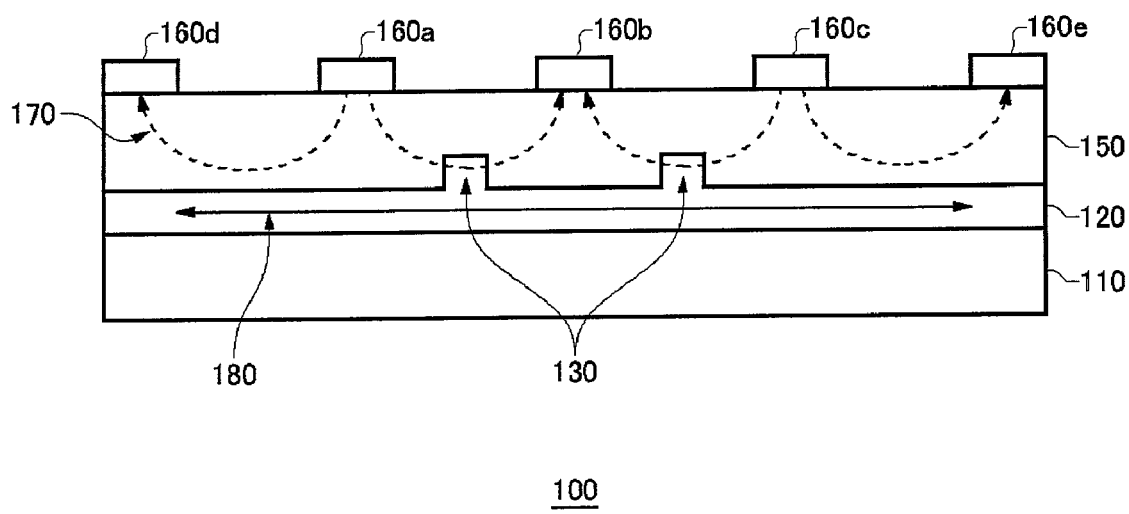
FIG. 10b shows an exemplary configuration of A-A' cross section in FIG. 10a of the modification example of the substrate structure 100 according to the present embodiment.

FIG. 10a shows a configuration of a modification example of the substrate structure 100 according to the present embodiment. FIG. 10b shows an exemplary configuration of A-A' cross section in FIG. 10a of the modification example of the substrate structure 100 according to the present embodiment. The members substrate structure 100 of FIGS. 10a and 10b of the present embodiment and those of FIGS. 2a and 2b that perform the same operations are assigned the same reference numerals.

The substrate structure 100 according to the present modification example further includes two electric field applying portions 160d and 160e, in addition to the three electric field applying portions 160a, 160b, and 160c. The substrate structure 100 may transfer an electric field signal via the electric field applying portions 160a and 160c, using the electric field applying portions 160b, 160d, and 160e as a common voltage. Here, the substrate structure 100 may transfer electric field signals of a same amplitude and a same phase, via the electric field applying portions 160a and 160c respectively. Accordingly, the substrate structure 100 can form a coplanar transfer path by sandwiching the two signal lines with the electric field applying portions corresponding to a common voltage, as well as providing signals of reverse phases to each other, to the two optical waveguides 130.

The two optical waveguides forming a Mach-Zehnder optical waveguide are desirably formed in a same shape and in a same waveguide length. If there is a slight difference in the two paths due to the manufacturing errors, however, even providing the two optical waveguides with signals of reverse phases to each other, the phase difference in optical signal transferred via the two optical waveguides will be displaced from the reverse phase by the amount of difference caused in the paths.

This deteriorates the switching extinction ratio of ON/OFF of the substrate structure 100. With this in view, in the substrate structure 100 according to the present modification example, electric field signals having different amplitudes and/or different phases from each other may be transferred via the electric field applying portions 160a and 160c, to correct the manufacturing error so as to improve the switching extinction ratio.

Figure 11A:
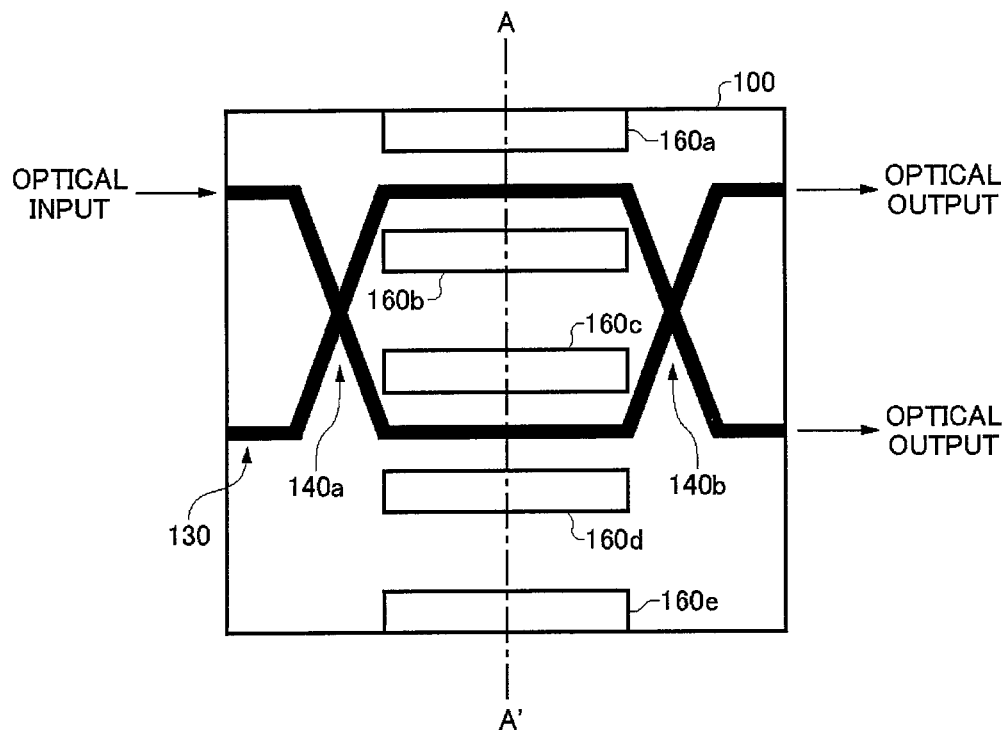
FIG. 11a shows a configuration of a modification example of the substrate structure 100 according to the present embodiment.
Figure 11B:
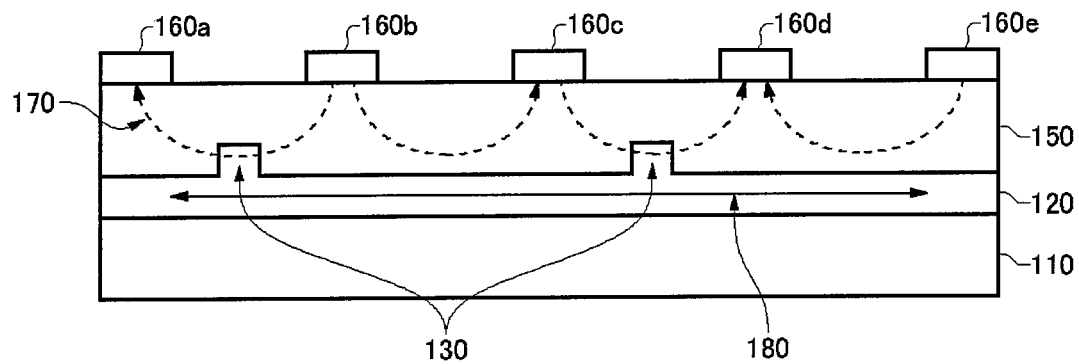
FIG. 11b shows an exemplary configuration of A-A' cross section in FIG. 11a of the modification example of the substrate structure 100 according to the present embodiment.

FIG. 11a shows a configuration of a modification example of the substrate structure 100 according to the present embodiment. FIG. 11b shows an exemplary configuration of A-A' cross section in FIG. 11a of the modification example of the substrate structure 100 according to the present embodiment. The members in the substrate structure 100 of FIGS. 11a and 11b of the present embodiment and those of FIGS. 2a and 2b that perform the same operations are assigned the same reference numerals.

The substrate structure 100 according to the present modification example includes five electric field applying portions 160a-160e. The substrate structure 100 may transfer an electric field signal via the electric field applying portions 160b and 160d, using the electric field applying portions 160a, 160c, and 160e as a common voltage. Here, the substrate structure 100 may transfer electric field signals of a same amplitude but different phases from each other, via the electric field applying portions 160b and 160d.

Accordingly, the substrate structure 100 can form a coplanar transfer path by sandwiching the two signal lines with the electric field applying portions corresponding to a common voltage, as well as providing signals of reverse phases to each other, to the two optical waveguides 130. Alternatively, the substrate structure 100 according to the present modification example may transfer electric field signals of different amplitudes from each other and/or different phases from each other, via the electric field applying portions 160b and 160d respectively, to correct the manufacturing error so as to improve the switching extinction ratio.

Alternatively, the substrate structure 100 may transfer an electric field signal via the electric field applying portions 160b and 160d, using the electric field applying portions 160a and 160e as a common voltage. Here, the substrate structure 100 may connect the electric field applying portion 160c with the electric field applying portions 160b and 160d, at a resistance of a same impedance respectively. Accordingly, the substrate structure 100, when applying a differential signal to the electric field applying portions 160b and 160d, can transfer the differential signal via the electric field applying portions 160b and 160d, using the electric field applying section 160c as an operational point voltage.

As a result, the electric field direction applied from the electric field applying portion 160b to the electric field applying portion 160c is equal to the electric field direction applied from the electric field applying portion 160c to the electric field applying portion 160d. On the other hand, the electric field direction applied from the electric field applying portion 160b to the electric field applying portion 160a is reversed to the electric field direction applied from the electric field applying portion 160c to the electric field applying portion 160d. Accordingly, the substrate structure 100 can form two signal lines by the coplanar transfer path, as well as providing signals of reverse phases to each other, to the two optical waveguides 130.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A substrate structure comprising:
   a base substrate of single crystal; and
   a rhombohedral fenrroelectric thin film exhibiting a spontaneous ferroelectric polarization and of a perovskite structure, the ferroelectric thin film being formed on a surface of the base substrate, wherein
   the fenrroelectric thin film is a PLZT thin film containing lanthanum in a composition ratio in a range of about 7at% to about 9at% or a $BaTiO_3$ thin film.

2. The substrate structure according to claim 1, further comprising:
   an optical waveguide formed on the ferroelectric thin film; and
   an electric field applying section that applies, to the optical waveguide, an electric field parallel to the surface of the base substrate.

3. A substrate structure comprising:
   a base substrate of single crystal;
   a rhombohedral ferroelectric thin film exhibiting a spontaneous ferroelectric polarization and of a perovskite structure, the ferroelectric thin film being formed on a surface of the base substrate;
   an optical waveguide formed on the ferroelectric thin film; and
   an electric field applying section that applies, to the optical waveguide, an electric field parallel to the surface of the base substrate, wherein
   the electric field applying section generates the electric field so that the electric field direction of the electric field applied to the optical waveguide is parallel to a direction of the spontaneous ferroelectric polarization of the ferroelectric thin film, and the ferroelectric thin film is a PLZT thin film containing lanthanum in a composition ratio in a range of about 7at % and to about 9at %, or a $BaTiO_3$ thin film.

4. The substrate structure according to claim 3, wherein the base substrate is made of an insulation material.

5. The substrate structure according to claim 4, wherein the base substrate has a relative dielectric constant lower than that of the ferroelectric thin film, and the substrate structure further comprises a low dielectric thin film formed on a surface of the ferroelectric thin film, the low dielectric thin film having a relative dielectric constant lower than that of the ferroelectric thin film.

6. The substrate structure according to claim 3, wherein the optical waveguide is a Mach-Zehnder optical waveguide that includes two linear waveguides provided in parallel to each other, and the electric field applying section includes a coplanar transfer path that applies an electric field to the two linear waveguides.

7. The substrate structure according to claim 3, wherein the base substrate is a sapphire substrate or a MgO substrate.

8. A manufacturing method for manufacturing a substrate structure, comprising:

preparing a base substrate of single crystal;

applying a sol-gel material on the base substrate; and annealing the applied sol-gel material at a predetermined atmospheric temperature, thereby forming a rhombohedral ferroelectric thin film exhibiting a spontaneous ferroelectric polarization and of a perovskite structure, wherein the applying the sol-gel material and the annealing the applied sol-gel material are repeated to stack a plurality of the ferroelectric thin films, and the annealing is performed in the predetermined atmospheric temperature at temperature rising/falling rates of smaller than 7 degrees centigrade per second.

9. The manufacturing method according to claim 8, wherein the annealing is performed in the predetermined atmospheric temperature at temperature rising/falling rates of no greater than 3 degrees centigrade per second.

10. The manufacturing method according to claim 9, wherein the annealing is performed by annealing the ferroelectric thin film in an atmosphere that is pressurized to no smaller than an atmospheric pressure and that contains oxygen in a volume ratio of no smaller than 20%.

11. The manufacturing method according to claim 10, wherein the annealing is performed in the atmosphere having a maximum temperature in a range of 550 degrees and 650 degrees, inclusive.

12. The manufacturing method according to claim 10, wherein the ferroelectric thin film formed by the annealing is a PLZT thin film containing lanthanum in a composition ratio in a range of about 7at % to about 9at %, $BaTiO_3$ thin film.

13. The manufacturing method according to claim 12, wherein the prepared substrate is a sapphire substrate or a MgO substrate.

14. The substrate structure according to claim 2, wherein the electric field applying section is directly formed on the ferroelectric thin film.

15. The substrate structure according to claim 6, wherein the electric field applying section includes exactly three electric field applying portions, two of which are formed at a uniform interval from one of the two linear waveguides, and two of which are formed at a uniform interval from the other of the two linear waveguides.

16. The substrate structure according to claim 6, wherein the electric field applying section includes exactly five electric field applying portions, and an electric field signal is transferred via two of the electric field applying portions with two or more of the other three electric field applying portions being used as a common voltage.

17. The substrate structure according to claim 16, wherein one of the two electric field applying portions via which the electric field signal is transferred is formed between the two linear waveguides in the direction of the electric field parallel to the surface of the base substrate.

18. The substrate structure according to claim 1, wherein the ferroelectric thin film is a PLZT thin film containing lanthanum in a composition ratio in a range of about 7at % to about 9at %, and the spontaneous ferroelectric polarization of the ferroelectric thin film is about ±55 degrees from the PLZT direction.

19. An optical switch comprising the substrate structure according to claim 1.

20. An optical modulator comprising the substrate structure according to claim 1.

* * * * *